Dec. 2, 1969　　　D. A. FRASER　　　3,481,223
CUTOFF DEVICE
Filed May 22, 1968　　　　　　　　　　2 Sheets-Sheet 1
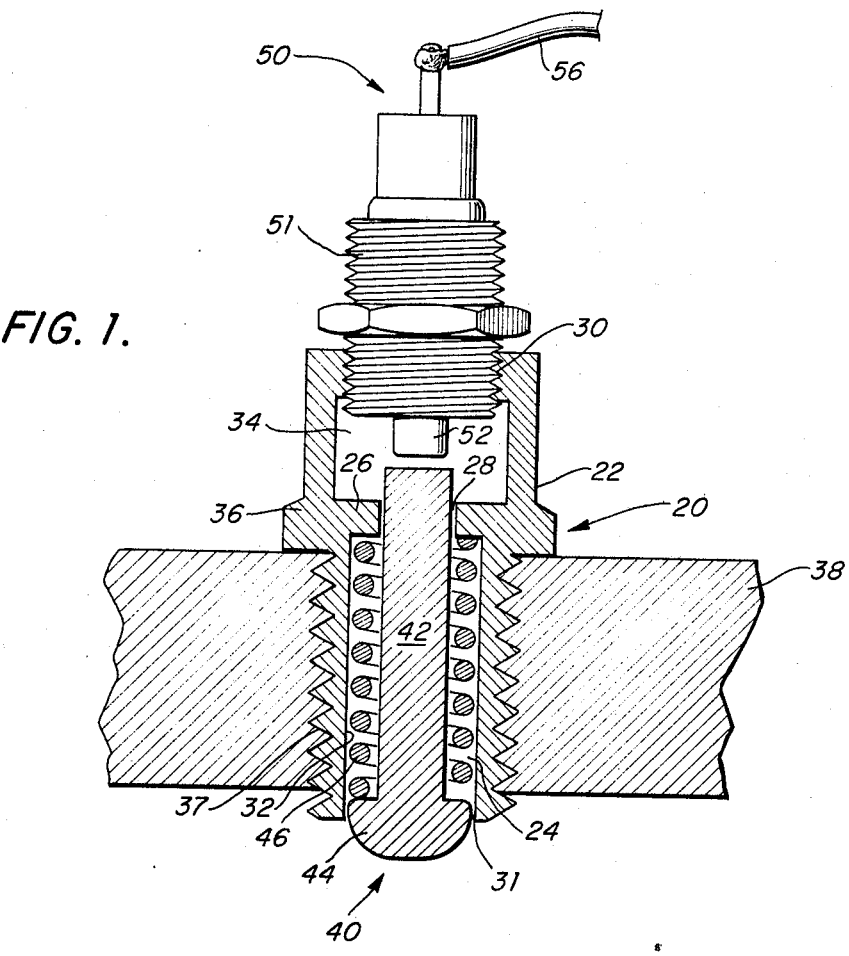
DOUGLAS ADAMS FRASER
INVENTOR.
BY
Nicholas A. Pondiscio
ATTORNEY.

Dec. 2, 1969  D. A. FRASER  3,481,223
CUTOFF DEVICE
Filed May 22, 1968  2 Sheets-Sheet 2

DOUGLAS ADAMS FRASER
INVENTOR.

BY
*Nicholas A. Pandiscio*
ATTORNEY.

United States Patent Office 3,481,223
Patented Dec. 2, 1969

3,481,223
CUTOFF DEVICE
Douglas A. Fraser, 29 Summer St.,
Sudbury, Mass. 01776
Filed May 22, 1968, Ser. No. 731,166
Int. Cl. F02d 39/00
U.S. Cl. 74—851                    14 Claims

ABSTRACT OF THE DISCLOSURE

In a motorcycle or motorbike transmission system wherein gears are shifted through the rotation of a rotatable indexing member in the form of a notched cam, plate, or drum, a combination device comprising releasable latch means for locking the indexing member against rotation when the gears are engaged so as to prevent gear slippage, and means for cutting off the engine ignition system when the gears are disengaged.

---

This invention pertains to internal combustion engines and transmission systems, primarily those used in motorcycles and motorbikes, and more particularly to a means for cutting off the engine when the transmission is shifted.

Typically, the transmission system of a motorbike comprises a selectively adjustable gear train assembly which is controlled by a shift mechanism that is operated by a foot pedal or hand operated shift-actuation mechanism. The shift mechanism usually comprises a rotatable indexing member in the form of a cam, plate, or drum and shifting means in the form of shifter forks or a reciprocal shifter rod that is coupled to the gear train assembly. When the indexing member is caused to rotate by operation of the foot pedal or hand operated shift-actuating mechanism, it initiates a predetermined movement of the shifter forks or reciprocating shifter rod, and the latter shifts the transmission gears. A portion of the outer edge or periphery of this indexing member is characterized by a plurality of indexing notches, each of which corresponds to a gear postion, i.e., neutral, first, second, third, high.

Since shifting is controlled by the movement of the indexing member, it is desirable to have the member locked in position when the transmission is engaged, to prevent the possibility of a gear accidentally slipping out of engagement. Hence, a spring-biased plunger, roller, or the like is commonly used to releasably engage a corresponding indexing notch and, in effect, "lock" the rotatable indexing member in position.

Another feature common to motorcycles and motorbikes is that shifting of the gears can be performed with or without the use of a clutch. However, when shifting without the clutch, it heretofore has been necessary to maintain the engine speed within a given r.p.m. range. Upon certain occasions, such as to obtain maximum acceleration through the entire gear range, it is desirable to by-pass the clutch and cause the gears to be shifted at will, without strict adherence to the engine speed.

Accordingly, it is the principal object of the present invention to provide in a motorcycle or motorbike powered by an internal combustion engine, the ability to shift gears over a broad r.p.m. range, without use of the clutch. This is achieved by interrupting ignition during shifting of the transmission.

Therefore, a more specific object is to provide a means for cutting off the engine when the transmission is being shifted, i.e., disengaged.

A further specific object is to couple the above cutoff means to the conventional spring-biased plunger device so that the ignition circuit is opened when the rotatable member is operated.

These and other objects are achieved by providing an engine cutoff device in the form of a switch which is electrically connected to the cycle's magneto or iginition system and is actuated by the spring biased plunger, roller, etc. when the latter releases the rotatable indexing member that shifts the transmission. The limit switch is normally open when the plunger engages an indexing notch. With the switch open, the ignition circuit operates to fire the spark plugs. When by actuation of a foot pedal or hand lever, the indexing member is rotated to cause the shifter forks or shifter rod to shift gears, the plunger retracts and thereby closes the switch. The switch remains closed and the ignition circuit remains cut off until the plunger drops into another gear-indexing notch.

Significantly, the operation of the above cutoff device is controlled only by the indexing member. Thus, it cuts off the engine during shifting regardless of whether the clutch is being used. Since it may be desirable to maintain engine power when using the clutch, provision is made to modify the invention accordingly. This may be accomplished by the use of a second switch connected in series to the first switch in the cutoff device and arranged to be actuated either manually or by operation of the clutch. The second switch is normally closed. However, when this second switch opens, it allows the ignition system to function normally.

Other features and many of the attendant advantages of the present invention are set forth in or rendered obvious by the following detailed description which is to be considered together with the accompanying drawings, wherein:

FIG. 1 is a sectional view, partially broken away, of a preferred form of plunger assembly constructed in accordance with the present invention;

FIG. 6 is a wiring diagram of the invention; and

FIG. 7 is a second wiring diagram showing the use of a clutch-operated switch.

Figure 5:
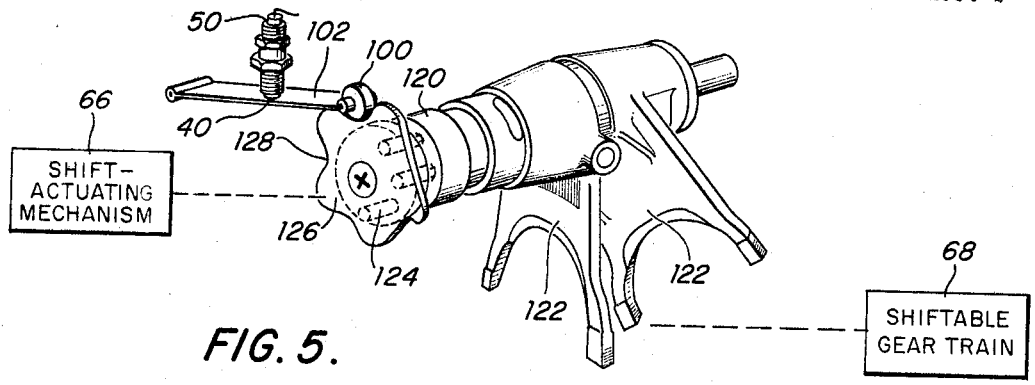
FIG. 5 is a partially schematic illustration showing the embodiment of FIG. 4 as applied to a drum type rotatable member.

Referring first to FIG. 1, there is shown a plunger assembly 20 comprising a hollow one-piece casing 22, preferably made of metal and having a longitudinal bore 24, which is interrupted intermediate its ends by an inwardly-extending annular shoulder 26, forming a circular orifice 28. The casing is open at both ends, one end being characterized by a threaded hole 30 substantially at the center thereof; the opposite end 31 is unthreaded. Shoulder 26 is so disposed that it defines a first elongated chamber 32, identified as that portion of bore 24 lying between the shoulder and the unthreaded open end 31; and a second elongated chamber 34, identified as that portion of bore 24 between the shoulder and the threaded hole 30.

Preferably but not necessarily, the outer surface of casing 22 is cylindrical, interrupted intermediate its length by a shoulder 36 having a hexagonal or other polygonal edge so as to be engageable by a standard socket or open-end wrench. The outer surface of the casing between shoulder 36 and the unthreaded end 31 is threaded as at 37 so that it may be screwed into a threaded hole formed in a suitable fixed support 38 associated with the rotatable indexing member (not shown) employed to shift the transmission.

Disposed within chamber 32 is an elongate plunger 40 preferably made of metal. The plunger comprises a rod 42 sized to make a sliding fit in orifice 28 and terminating in an enlarged section 44 sized to make a sliding fit in bore 24. The plunger is shorter than the bore 24 so that it may move from a first extended position wherein the section 44 projects from the casing (FIG. 1) to a second retracted position where all or substantially all of the section 44 is within the casing. The enlarged section 44 is shaped to mate with the notches of the rotatable indexing member. The plunger is urged away from shoulder 26 by a compression spring 46 which surrounds rod 42 and whose ends abut shoulder 26 and section 44. If desired, the spring may be secured to shoulder 26 and/or section 44. However, this is not necessary since in the usual case the plunger is prevented from coming out of the casing by the rotatable indexing member with which it is engaged.

The assembly shown in FIG. 1 also includes a normally open switch 50 comprising a metal case 51 screwed into hole 30. The switch is a conventional mechanically-actuated, single-throw unit of the type commonly used as a limit switch. As represented schematically in FIG. 6, a switch 50 has a plunger-type movable contact 52 which is movable toward and away from a pair of fixed contacts 53 and 54. One of the contacts 54 is connected to a terminal lead 56; the other contact 53 is connected to the metal case 51. The switch also includes a spring 58 which holds the contact 52 away from contacts 53 and 54. The lead 56 is attached and coupled to the ignition system, e.g., a magneto 62, which is adapted to provide a high voltage to fire one or more spark plugs 64. The contact 53 is grounded via case 51 and casing 22.

Figure 2:
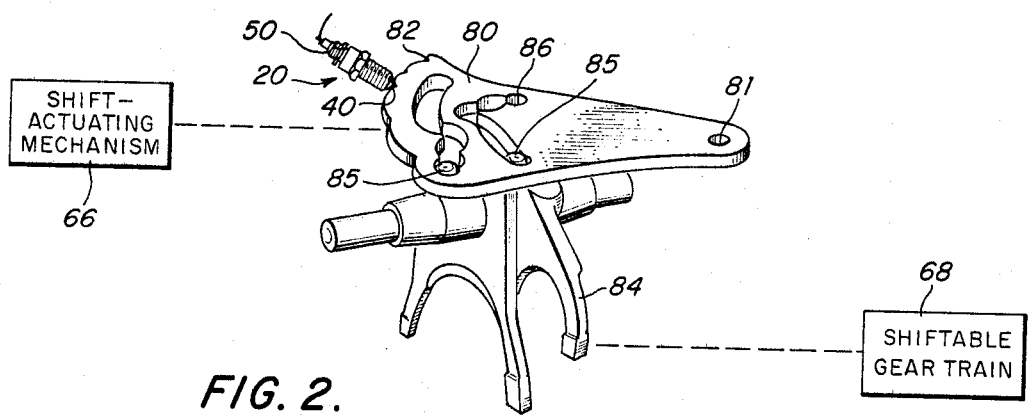
FIGS. 2 and 3 are partially schematic illustrations showing the invention as applied to plate and cam type rotatable members.
Figure 3:
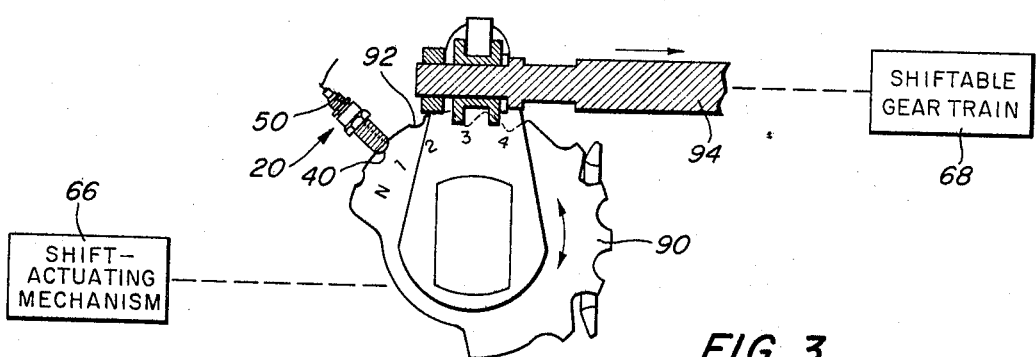

Referring now individually to FIGS. 2 and 3, the assembly of FIG. 1 is shown in operable relationship to the relevant portions of two typical motorcycle transmission systems.

As stated hereinbefore, the transmission of a motorcycle or motorbike is shifted by the use of either a foot pedal or hand-operated lever, depending upon the make and model of the vehicle, with motion being transferred to the rotatable indexing member, i.e. cam, plate, or drum, of the shift mechanism by a suitable mechanical linkage. Foot-pedal operation is the more common, and comprises a pedal or foot lever, extended to where the foot may pivot it in an upward or downward direction. Usually the pedal is spring-loaded toward the center position and, through intermediate actuating and shifting mechanisms, as above described, will advance the transmission one gear, either up or down, for each time the pedal is moved a full stroke up or down and allowed to return to the center position. A hand-operated gear lever is commonly used on the smaller motorbikes and is mounted on one of the handle bars in the form of a twist-grip. This latter type uses a push-pull cable arrangement between the twist-grip and an indexing member so that the indexing is transmitted directly to the transmission. Since foot and hand-operated shift actuating linkages and motorbike and motorcycle transmission gear trains are well known in the art, and form no significant part of this invention, they need not be further described and are represented in FIGS. 2, 3 and 5 as shift-actuating mechanism 66 and shiftable gear train 68. Details of typical types of shift-actuating linkages and transmisisons are described in Chilton's Yamaha Repair & Tune-up Guide, OCee Ritch, Chilton Book Company, (1967) e.g. pages 20–54; also Chilton's Honda Repair and Tune-up Guide, OCee Ritch, Chilton Books, (1966), e.g. pages 72–77.

Referring now specifically to FIG. 2, the shift change actuating mechanism 66 is mechanically coupled to the shiftable gear train 68 by an indexing member in the form of a plate 80 arranged to rotate about a pivot point 81 and formed with a plurality of gear-indexing notches 82 about its edge. Shifting of the gears is accomplished through the use of shifter forks 84 which have cam follower extensions 85 that ride along grooves 86 cut into the flat surface of plate 80. Rotation of the plate causes the forks to slide and thereby shift gears. The assembly 20 of FIG. 1 is positioned adjacent plate 80 so that its plunger 40 is engageable with the notched edge thereof and its switch 50 is connected as above-described so that the engine's ignition is cutoff during the time that the plunger 40 is not in one of the notches 82.

In FIG. 3, the rotatable indexing member is a cam 90, having notches 92 about its edge. The assembly 20 of FIG. 1 is again positioned so that its plunger 40 will engage the notched edge of the indexing member. Here, the rotation of the cam can be used to operate shifter forks or, as shown, to operate a reciprocating shifter rod 94.

Figure 4:
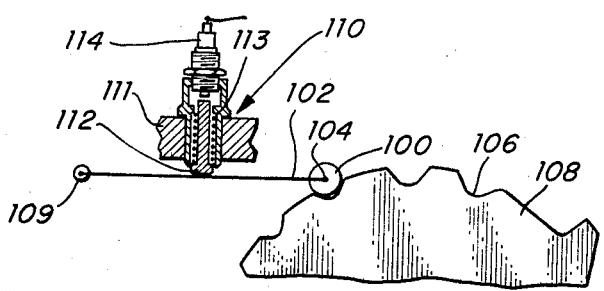
FIG. 4 represents still another embodiment of the present invention.

FIG. 4 schematically illustrates another embodiment of the invention wherein the assembly 20 of FIG. 1 is indirectly coupled to a rotary indexing member of a transmission. In this case, a roller 100 is linked to a rigid arm 102 by a pin 104 and disposed so as to be engageable with a series of notches 106 along the periphery of a rotatable indexing member, e.g., cam 108. The opposite end of arm 102 is arranged to rotate about a fixed pivot point 109. A plunger assembly 110, similar to assembly 20 as described in FIG. 1, is mounted adjacent arm 102. As shown, the assembly is mounted in a suitable fixed support 111 and has a plunger 112 biased by a spring 113 so as to be retractably engageable with a switch 114, the latter being connected to the ignition system. In operation, plunger 112 is biased against arm 102 so that roller 100 contacts the edge of cam 108. When the roller engages an indexing notch 106, the plunger disengages switch 114. When the roller rides out of an indexing notch, plunger 112 engages and actuates switch 114.

In FIG. 5, the shift change mechanism 66 is mechanically coupled to the shiftable gear train by a drum-type shift mechanism comprising a rotatable drum member 120 having a pair of shifting forks 122 disposed about the drum. These forks, which are mechanically coupled to the gear train, are moved into the desired gear-shifting position by two contoured grooves (not shown) formed about the periphery of the drum member. The grooves are arranged to cause the forks to move laterally along the length of the drum as the latter rotates, and such movement of the forks causes the gears to be shifted. At one end of the drum are shifting pins 124 which are engaged and actuated by shift actuating mechanism 66 to rotate drum member 120. The drum-type shift mechanism is formed with a surface 126 having a series or a row of gear-indexing notches 128 around its edge. The plunger assembly 110 and arm 102 of FIG. 4 are disposed in predetermined relation to the drum member, so that roller 100 retractably engages the notched surface of the drum member. When the transmission is in gear, drum surface 126 is positioned so that one of its gear-indexing notches 128 is aligned with roller 100, in which position drum member 120 is locked by the force on arm 102 of plunger 112 acting under the bias of spring 113. However, when the actuating mechanism 66 is operated, the torque which it imposes on the drum member overcomes the locking force of plunger 112 and roller 100, and causes plunger 112 to retract so that the roller rides along the drum surface. This continues until the next successive notch 106 has advanced into alignment with roller 100, whereupon the force of spring 113 against plunger 112 moves roller 100 into locking relation with the drum member. So long as roller 100 does not move back into one of notches 106, the plunger 112 will engage switch 114 and hold it closed, with the result that the ignition is grounded to interrupt firing of the spark plugs. This interruption will continue until the roller moves back into one of notches 106, which occurs when the transmission is again engaged.

A modification of the present invention includes the addition of a clutch-operated switch 130. In FIG. 7, a normally closed switch 130 is mechanically connected through the operating lever 132 of a motorbike or motorcycle clutch 134 so as to be actuated thereby when the latter is disengaged. Switch 130 is electrically coupled in series with switch 50. When the clutch is disengaged, switch 130 opens and prevents grounding of the magneto, with the result that current can pass to the spark plug or plugs 64. Hence the operator can shift gears with or without using the clutch—with the engine producing torque when the clutch is used, or cut-out when the clutch is not used. Since engines and clutches for motorcycles and motorbikes are well known in the art and form no significant part of the invention, they need not be further described and as stated hereinabove are represented in FIG. 7 as operating lever 132, clutch 134, and engine 136. It should be noted that the circuit also can be modified so that in some applications the current to the plugs can be interrupted without grounding.

I claim:

1. In combination with a motorbike having an internal combustion engine with an ignition system and a shiftable transmission wherein the shifting of gears is effected through selective indexing of a rotatable indexing member having a plurality of spaced indexing notches, the improvement comprising a device for (a) locking said indexing member against rotation when one of said gears of said transmission is engaged and (b) cutting off flow of electrical power from said ignition system to said engine when said gears are disengaged, said device comprising:
   a reciprocal mounted locking member positioned to releasably lock said indexing member upon entry into any of said notches;
   an electrical switch having an open state and a closed state;
   means connecting said switch to said ignition system so that said ignition system is operative when said switch in is one state and inoperative when said switch is in the other state; and
   said switch normally being in said one state and being placed in said other state whenever and so long as said locking members is retracted from said notches.

2. The combination of claim 1 wherein said device comprises a case, and further wherein said locking member is reciprocally mounted within said case.

3. The combination of claim 2 wherein said case further includes a spring mounted so as to bias said locking member into engagement with said indexing member.

4. The combination of claim 3 wherein said electrical switch is attached to said case, and further wherein said locking member includes means for actuating said switch to said other state when said locking member is retracted from said notches.

5. The combination of claim 1 wherein said switch is normally open.

6. The combination of claim 5 wherein said ignition system comprises at least one spark plug and a magneto for energizing said at least one spark plug and further wherein said switch and magneto are connected so that said magneto is disabled when said switch is in said other state.

7. The combination of claim 1 wherein said switch includes a moveable contact member, and further wherein said moveable contact member is actuated by said locking member.

8. The combination of claim 1 wherein said locking member comprises part of a pivotally mounted arm and further including spring means biasing said arm so as to hold said locking member in engagement with said indexing member.

9. The combination of claim 1 wherein said motorbike includes a clutch mechanism for said transmission, and further including a second switch and means for actuation of said second switch when said clutch is disengaged, said switch being connected to said ignition system so as to negate the effect of said first switch on said ignition system when said locking member is retracted from said notches.

10. For use in a motorbike having an internal combustion engine with an electrical ignition system and a shiftable transmission wherein the shifting of gears is effected through selective indexing of a rotatable indexing member having a surface with a plurality of spaced indexing notches, a device adapted to be mounted to said transmission comprising a reciprocally mounted member for releasably locking said indexing member against rotation by entry into one of said notches, a spring biasing said reciprocally mounted member into engagement with said surface, and an electrical switch having a lead for connection to said ignition system and a moveable actuating member positioned to be moved to actuate said switch in response to retracting movement of said reciprocally mounted member relative to said indexing member.

11. A device as defined by claim 10 further comprising a case having means for attaching said case to said transmission, said reciprocally mounted member and said spring being mounted within said case.

12. A device as defined by claim 11 wherein said switch is supported by said case.

13. A device as defined by claim 12 wherein said moveable actuating member is disposed within said case in position to be engaged and moved by said reciprocally mounted member.

14. A device as defined by claim 13 wherein said reciprocally mounted member is an elongate plunger, and further wherein said spring is a compression spring coiled about said plunger and having one end bearing against a shoulder in said case and its opposite end bearing against a shoulder on said plunger.

References Cited

UNITED STATES PATENTS

| 2,387,891 | 10/1945 | Elkin | 74—851 |
| 2,519,080 | 8/1950 | Simpson | 74—851 X |
| 2,741,350 | 4/1956 | Dodge | 74—851 X |

FOREIGN PATENTS

| 1,051,103 | 1/1954 | France. |

LEONARD H. GERIN, Primary Examiner